United States Patent [19]
Baak et al.

[11] 3,779,781
[45] Dec. 18, 1973

[54] COPPER ALUMINOSILICATE GLASS COMPOSITIONS

[75] Inventors: Nils Tryggve E. A. Baak, Princeton, N.J.; Charles F. Rapp, Toledo, Ohio

[73] Assignee: Owens-Illinois, Inc., Toledo, Ohio

[22] Filed: Nov. 12, 1970

[21] Appl. No.: 88,971

Related U.S. Application Data

[63] Continuation-in-part of Ser. No. 552,992, May 25, 1966, abandoned, which is a continuation-in-part of Ser. No. 465,381, June 21, 1965, abandoned.

[52] U.S. Cl............... 106/52, 106/54, 350/310
[51] Int. Cl......... C03c 3/04, C03c 3/06, C03c 3/08
[58] Field of Search.................. 106/52, 54, 48; 350/310

[56] References Cited
UNITED STATES PATENTS

| | | | |
|---|---|---|---|
| 3,420,645 | 1/1969 | Hair | 106/52 X |
| 3,464,806 | 9/1969 | Seki et al. | 106/54 X |
| 3,528,829 | 9/1970 | Baak et al. | 106/54 X |
| 3,498,876 | 3/1970 | Baak et al. | 106/52 X |
| 3,294,496 | 12/1961 | Berghezan | 106/65 X |
| 3,442,666 | 5/1969 | Berghezan | 106/39 R |
| 3,442,667 | 5/1969 | Berghezan | 106/39 R |
| 3,557,576 | 1/1971 | Baum | 65/22 |
| 3,231,456 | 1/1966 | McMillan | 65/30 |
| 2,326,059 | 8/1943 | Nordberg | 106/52 |
| 1,532,002 | 3/1925 | Thomson | 350/310 |
| 3,365,315 | 1/1968 | Beck et al. | 65/22 |
| 3,275,492 | 9/1966 | Herbert | 106/52 |
| 2,685,526 | 8/1954 | Labino | 106/50 |
| 2,733,158 | 1/1956 | Tiede | 106/50 |
| 3,127,277 | 3/1964 | Tiede | 106/50 |

OTHER PUBLICATIONS

Levin et al. "Phase Diagram for Ceramists" 1969 Supplement Index page 594.

*Primary Examiner*—Helen M. McCarthy
*Attorney*—Richard B. Dence et al.

[57] ABSTRACT

Copper aluminosilicate glass compositions are disclosed possessing desirable properties including low coefficients of thermal expansion, relatively low melting temperatures, good resistance to thermal shock, good characteristics and good chemical durability. The glass compositions are based on the copper aluminosilicate glass system containing as the essential ingredients from 1.5 to 35 mole percent copper oxide, together with from 0.5 to 30 mole percent alumina and 50 to 94 mole percent silica. The remaining balance consists of other compatible ingredients used in glass making. Ternary compositions of copper oxide, alumina and silica contain at least 60 mole percent silica.

38 Claims, 4 Drawing Figures

INVENTORS
NILS TRYGGVE EMANUEL
ALFREDSSON BÅÅK
CHARLES FREDERICK RAPP

COPPER ALUMINOSILICATE GLASS COMPOSITIONS

This application is a continuation-in-part of our co-pending application Ser. No. 552,992 filed May 25, 1966, now abandoned, which in turn is a continuation-in-part of our application Ser. No. 465,381 filed June 21, 1965, now abandoned, and the entire disclosures of both of these prior applications are relied on and incorporated herein by reference.

The present invention relates to novel glass compositions and, more particularly, glass compositions containing copper oxide which have low coefficients of thermal expansion and relatively low temperature melting characteristics. The invention further relates to products made from the copper glass compositions, and the method of making same.

Glasses possessing low expansion characteristics are extremely advantageous and desirable for the reason that their thermal shock resistance is good and any dimensional changes in articles produced from these glasses are kept at a minimum. Because of the unusually good properties of the glasses of the present invention, the novel compositions can be utilized in any number of applications. Because of their relative ease of melting and low thermal expansion, the copper glasses of the present invention are excellent as sealing glasses, particularly for fused quartz. Optical devices require extremely precise dimensions and for that reason glasses which undergo significant changes in shape and dimensions with changes in ambient temperatures cannot be tolerated for these purposes. Glasses of the present invention, however, because their coefficients of thermal expansion are relatively low, are exceptionally well-suited for the production of such devices as astronomical mirrors. It has been determined that the glasses of the present invention show excellent performance for such mirrors and that the optical image is relatively undistorted by sharp variations in temperature.

Accordingly, it is an object of the present invention to provide glass compositions that have desirable properties and characteristics.

It is a further object of the present invention to provide glass compositions wherein copper is present as a major and important constituent of the glass.

It is a further object of the present invention to provide copper glass compositions wherein at least a substantial amount of the copper is present in the cuprous state.

It is a further object of the present invention to provide copper glass compositions that have low coefficients of thermal expansion.

It is a further object of the present invention to provide copper glass compositions that have relatively low melting characteristics.

It is a further object of the present invention to provide colored glasses containing copper oxides that have good resistance to thermal shock and relatively low melting temperatures.

It is a further object of the present invention to provide copper glasses having desirable properties which make them suitable for a wide variety of uses.

It is a further object of the present invention to provide copper glasses having low coefficients of thermal expansion and good resistance to thermal shock which make them suitable for the preparation of optical devices.

It is a further object of the present invention to provide copper glasses of relatively high fluidity that are useful as sealing glasses.

It is a further object of the present invention to provide novel copper glass compositions that have good chemical durability and which are useful as sealing glasses.

It is a further object of the present invention to provide articles produced from the novel glass compositions having desirable properties.

It is a further object of the present invention to provide shaped optical devices that have desirable properties and characteristics.

In attaining the above objects, one feature of the present invention resides in ternary copper glass compositions of the copper oxide (copper oxide herein being cuprous oxide or cupric oxide and cuprous oxide together)-alumina-silica [($Cu_2O$-$CuO$)-$Al_2O_3$-$SiO_2$] system. It is believed that a substantial amount of copper in the glass is in the cuprous state. Preferably, a predominant amount, i.e., at least 50 mole percent of the copper is in the cuprous state. Therefore, the system is referred to hereinafter as the $Cu_2O$-$Al_2O_3$-$SiO_2$ system in which "$Cu_2O$" means either cuprous oxide or cuprous and cupric oxide together. It should also be understood that the description "$Cu_2O$" when used hereinafter in a list of components in a glass composition means copper oxide present as cuprous oxide or as both cuprous oxide and cupric oxide together.

As starting materials in the batch, copper oxide in both forms may be used for purposes of the present invention because the final state of the copper is independent of the original oxidation state of the copper. If it is desired to reach a particular oxidation state of copper, this can be achieved by providing oxidizing conditions proper for the desired state.

Ternary copper glass compositions of the above system consist essentially of 1.5 to 35 mole percent copper oxide, 0.5 to 30 mole percent alumina, and silica. In this particular aspect of the present invention wherein the glass is a ternary system, the silica is present in an amount ranging from 60 to 94 mole percent. The coefficients of thermal expansion of these ternary glasses are relatively low, generally being about $10 \times 10^{-7}$ or less.

In another feature of the present invention, copper aluminosilicate glass compositions are provided which, in addition to the copper oxide, alumina and silica, contain at least one other compatible ingredient used in glass making.

According to a still further feature of the present invention, copper aluminosilicate glass compositions are provided based on the $Cu_2O$-$Al_2O_3$-$SiO_2$ system which additionally contain titanium dioxide ($TiO_2$) or boric oxide ($B_2O_3$) or both titanium oxide and boric oxide. Copper glasses coming within this aspect of the present invention have the following composition, all ranges being inclusive of the terminal values: copper oxide ($Cu_2O$ + $CuO$) 1.5 to 35 mole percent; alumina ($Al_2O_3$) 0.5 to 29.5 mole percent; silica ($SiO_2$) 50 to 94 mole percent; titanium dioxide ($TiO_2$) 0 to 11 mole percent; and boric oxide ($B_2O_3$) 0 to 12.5 mole percent, wherein the sum of $TiO_2$ + $B_2O_3$ is at least about 0.5 mole percent.

Another feature of the present invention resides in copper glass compositions of the copper oxide-alumina-silica system to which have been added a fluoride-containing component, such as $AlF_3$, which contributes fluoride to the resulting glass composition.

Still a further feature of the present invention resides in copper glasses formed from the $Cu_2O$-$Al_2O_3$-$SiO_2$ system having added thereto selected quantities of other ingredients such as boron, nickel, chromium, iron, cobalt, tantalum, tungsten, manganese, other transition metals, rare earth oxides and mixtures thereof.

Other objects, features and advantages of the present invention will become apparent from the following detailed description thereof, taken in conjunction with the drawings wherein:

The copper glasses of the present invention have extremely desirable characteristics of low linear thermal expansion and a relatively low melting point. Although the thermal expansion characteristics of the glasses of the present invention are influenced by the presence of the oxides of copper, the variation in the copper content unexpectedly does not produce great variations in the thermal expansion of the glasses, as will be seen from FIG. 1. According to the present invention, copper glasses are obtained that generally have coefficients of thermal expansion which are less than the coefficient of thermal expansion of fused silica at corresponding temperatures. For a comparison, reference is made to FIG. 2.

Heretofore, it has been generally accepted that low melting characteristics and low thermal expansion of glasses were properties that were incompatible with each other. The present invention has demonstrated that this generally accepted principle is not applicable to the compositions that are described herein. General experience has been that the lower the thermal expansion, the higher the melting temperature becomes. This property has not been observed in the copper glasses of the present invention. On the contrary, one of the important aspects of the copper glasses of the $Cu_2O$-$Al_2O_3$-$SiO_2$ system is their surprising viscosity-thermal expansion behavior. That is, the copper glasses of the present invention display the extremely desirable characteristics of both low expansion and relatively low melting temperatures.

Figure 1:
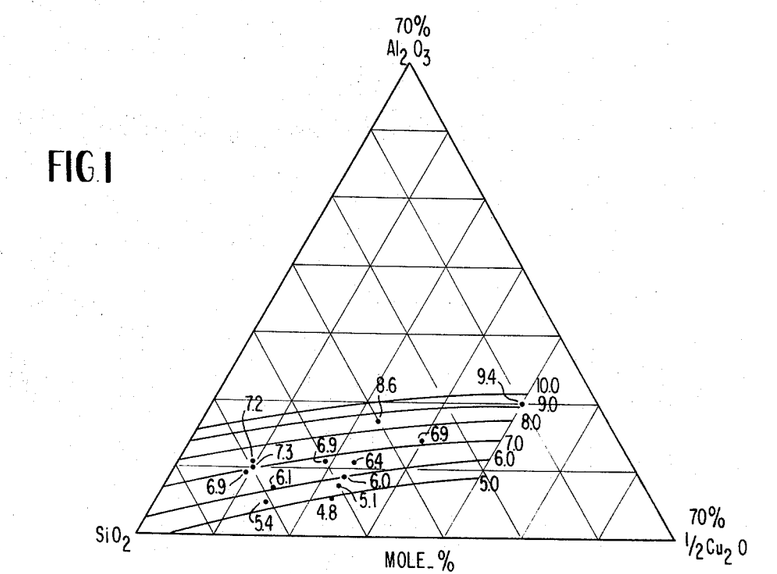
FIG. 1 is a graph showing coefficients of thermal expansion between 0°–300° C. as a function of composition of the ½ $Cu_2O$-$Al_2O_3$-$SiO_2$ system (unannealed)
Figure 2:
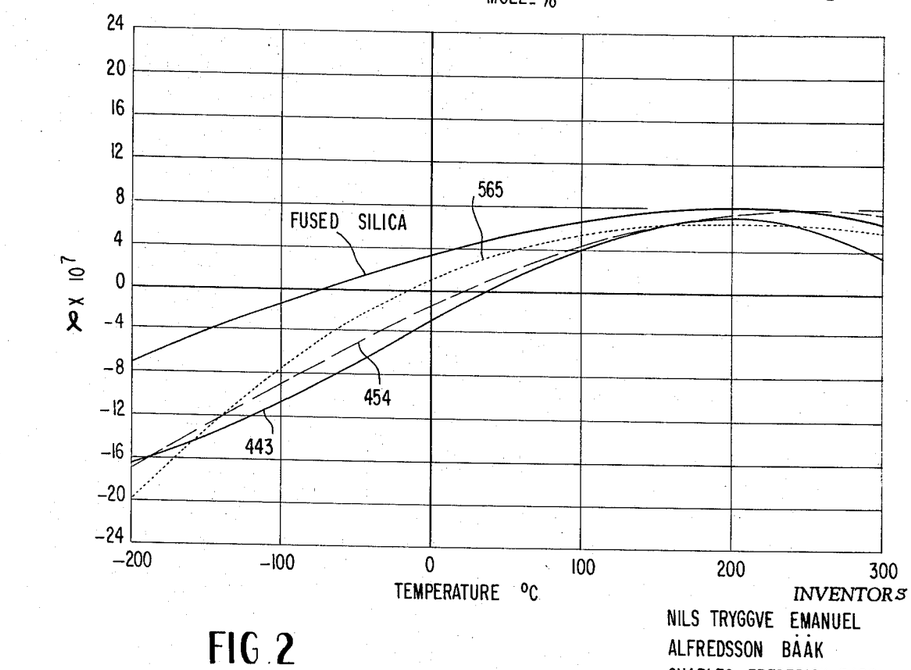
FIG. 2 is a graph showing the behavior of the coefficient of thermal expansion, as a function of the temperature, of three representative annealed glasses of the present invention compared with fused silica.

FIG. 1 is a diagram showing the coefficient of thermal expansion as a function of composition for the system ½ $Cu_2O$-$Al_2O_3$-$SiO_2$ (0°–300° C.) (unannealed).

Figures 3, 4:
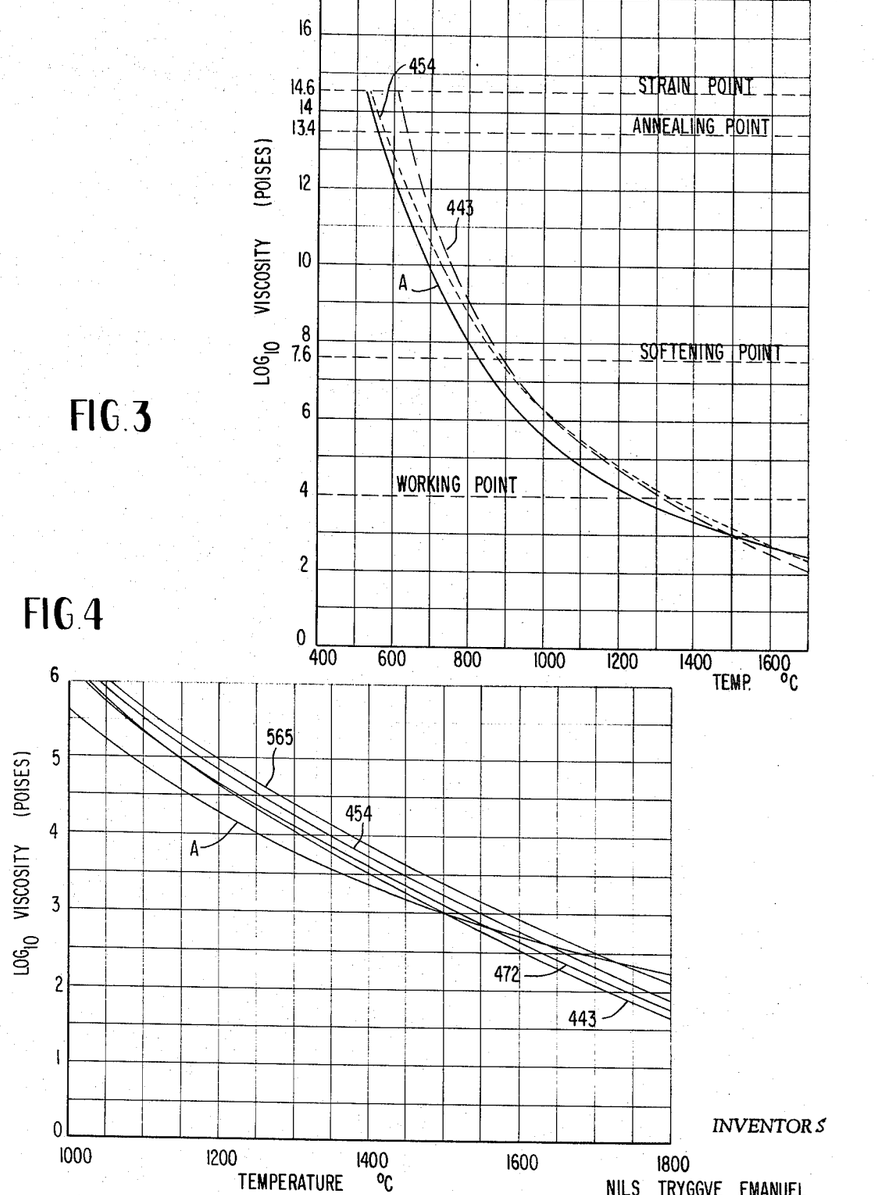
FIG. 3 is a graph of Viscosity-Temperature curves comparing representative copper glasses of the present invention with a commercially available low expansion borosilicate glass identified as A.
FIG. 4 is a graph of High Temperature Viscosity Curves of representative copper glasses of the present invention compared with a commercially available low expansion borosilicate glass (A).

FIGS. 3 and 4 show that the copper glasses of the present invention have excellent fluidity at relatively low temperatures and possess a desirable working point.

Owing to the fact that copper is used as a major constituent in the glasses of the present invention, as expected, the glasses are strongly colored, generally green, reddish, brown or black depending on the copper concentration and the thickness of the glass. An important factor concerning the oxidation state of the copper is the temperature. At high temperature, the monovalent cuprous state is favored while low temperatures favor the divalent cupric state. For that reason, for general applications, a controlled atmosphere can be used to protect the glass or glass surface. An oxidizing, neutral atmosphere or slightly reducing atmosphere may be used for the desired purpose. Other conditions which are necessary to produce particular articles are described hereinafter.

According to the present invention, there is provided ternary copper glasses of the $Cu_2O$-$Al_2O_3$-$SiO_2$ system having low expansion and relatively low melting temperatures comprising the following components, all values being in mole percent, based on the total composition:

| | |
|---|---|
| $SiO_2$ | 60–94 |
| $Al_2O_3$ | 0.5–30 |
| $Cu_2O$ | 1.5–35 |

In preparing glasses of the above composition, the batch ingredients are mixed, melted and heated to such temperatures so that all substances are present in the liquid state thereby enabling the formation of a glass from a homogeneous melt. Generally, these glasses have coefficients of thermal expansion of about $10 \times 10^{-7}$ (0°–300° C.) or less. Particularly suitable copper glasses are those wherein the sum of $SiO_2$ + $Cu_2O$ is at least 70 mole percent, preferably 80 mole percent. Also preferred are compositions wherein the sum of $Cu_2O$ + $Al_2O_3$ is at least 10 mole percent. In the preferred aspect of the invention the mole ratio of $Cu_2O$:$Al_2O_3$ ranges from about 0.9:1–2:1.

Extremely desirable copper glasses are further provided by the present invention based on the $Cu_2O$-$Al_2O_3$-$SiO_2$ system which additionally have $TiO_2$, or $B_2O_3$, or both present, as shown in the following composition, all values being in mole percent:

| | |
|---|---|
| $SiO_2$ | 50–94 |
| $Al_2O_3$ | 0.5–29.5 |
| $Cu_2O$ | 1.5–35 |
| $TiO_2$ | 0–11 |
| $B_2O_3$ | 0–12.5 | wherein the sum of $TiO_2$ + $B_2O_3$ is at least 0.5 mole percent and the sum of $SiO_2$ + $Cu_2O$ is at least 70 mole percent.

Particularly suitable compositions coming within this aspect of the invention are those wherein the sum of $SiO_2$ + $Cu_2O$ is at least 80 mole percent, the sum of $Cu_2O$ + $Al_2O_3$ is at least 5 mole percent and the sum of $TiO_2$ + $B_2O_3$ is at least 0.5 mole percent, and such compositions are shown below in mole percent:

| | |
|---|---|
| $SiO_2$ | 72–92 |
| $Al_2O_3$ | 0.5–12.5 |
| $Cu_2O$ | 1.5–12.5 |
| $TiO_2$ | 0–11 |
| $B_2O_3$ | 0–12.5 |
| $SiO_2$ | 72–90 |
| $Al_2O_3$ | 2.5–12.5 |
| $Cu_2O$ | 3–12.5 |
| $TiO_2$ | 1–10.1 |
| $SiO_2$ | 74–86 |
| $Al_2O_3$ | 2.5–12.5 |
| $Cu_2O$ | 3–12.5 |
| $B_2O_3$ | 0.5–12.5 |

| | |
|---|---|
| SiO$_2$ | 72–86 |
| Al$_2$O$_3$ | 0.5–12.5 |
| Cu$_2$O | 1.5–12.5 |
| TiO$_2$ | 2–8 |
| B$_2$O$_3$ | 0.5–6.5 |

Another aspect of the present invention relates to copper glass compositions of the copper oxide-alumina-silica system in which fluoride ions are present and are substituted for an equivalent number of oxide ions (e.g. two fluoride ions substituted for one oxide ion) in one or more of the glass constituents. These compositions comprise the following components in the indicated amounts, all values being in mole percent, and the fluoride being represented as being combined with aluminum as aluminum fluoride.

| | |
|---|---|
| SiO$_2$ | 50–94 |
| Al$_2$O$_3$ | 0.5–29.5 |
| Cu$_2$O | 1.5–35 |
| AlF$_3$ | at least 0.5 up to about 6.5 | wherein the sum of SiO$_2$ + Cu$_2$O is at least 70 mole percent.

The preferred amount of the fluoride-containing component is up to about 1 mole percent.

It is to be understood that while AlF$_3$ is illustrated as the fluoride-containing component, other functionally equivalent fluoride components may be used in place thereof to contribute fluoride to the final glass composition.

In a further feature of the present invention, copper glasses of the Cu$_2$O-Al$_2$O$_3$-SiO$_2$ system are modified by the inclusion of oxides of nickel, iron, cobalt, manganese, chromium, tantalum, tungsten, other transition metals, rare earth oxides, and mixtures thereof. Oxides of titanium and boron may also be present in such compositions, either separately or together.

Compositions included within this aspect of the invention are defined below, all amounts being in mole percent, wherein the sum of SiO$_2$ + Cu$_2$O is at least 70 mole percent and the remaining balance is at least about 0.5 mole percent.

| | |
|---|---|
| SiO$_2$ | 50–94 |
| Al$_2$O$_3$ | 0.5–29.5 |
| Cu$_2$O | 1.5–35 | and at least one of the following components being present in more than trace amounts and within the mole percent ranges hereinafter set forth:

| | |
|---|---|
| NiO | 0–2.5 |
| TiO$_2$ | 0–11 |
| B$_2$O$_3$ | 0–12.5 |
| Iron oxide expressed as Fe$_2$O$_3$ | 0–6 |
| CoO | 0–6 |
| AlF$_3$ | 0–6.5 |

Particularly preferred among the above compositions are those wherein the sum of SiO$_2$ + Cu$_2$O is at least 85 mole percent, in which case the maximum Al$_2$O$_3$ is about 14.5 mole percent. Also preferred among these latter compositions are compositions containing 0–11 mole percent TiO$_2$; 0–12.5 mole percent B$_2$O$_3$; and 0–6.5 mole percent fluoride expressed as AlF$_3$.

A preferred composition coming within the scope of the above-modified Cu$_2$O-Al$_2$O$_3$-SiO$_2$ composition is one containing 73–80 SiO$_2$, 6.5–10 Al$_2$O$_3$, 10–12.5 Cu$_2$O, all other constituents remaining the same and all amounts being in the mole percent range indicated above.

Significant amounts of oxides of any of the aforementioned manganese, chromium, tantalum, tungsten, transition metals and rare earth oxides may also be present in the above-modified SiO$_2$-Al$_2$O$_3$-Cu$_2$O glass compositions. Moreover, it is to be noted that some of the above-mentioned modifying oxides may be introduced into the glasses of the present invention by virtue of impurities in the starting or batch materials. Such variation of the compositions of the present invention is intended to be encompassed by the claims.

The modifying oxides may be batched into the copper glass composition of the present invention in the form of oxides, carbonates, fluorides, silicates, or any other form which does not disturb or adversely affect the resultant glass.

Further preferred modifications of the Cu$_2$O-Al$_2$O$_3$-SiO$_2$ base glass compositions of the present invention are listed below:

| Component | Mole Percent |
|---|---|
| SiO$_2$ | 73–80 |
| Al$_2$O$_3$ | 6.5–10 |
| Cu$_2$O | 10–12.5 |
| TiO$_2$ | 1 |
| B$_2$O$_3$ | 1 |
| Iron oxide expressed as Fe$_2$O$_3$ | 1–6 |

| Component | Mole Percent |
|---|---|
| SiO$_2$ | 73–80 |
| Al$_2$O$_3$ | 6.5–10 |
| Cu$_2$O | 10–12.5 |
| TiO$_2$ | 1.5 |
| Iron oxide expressed as Fe$_2$O$_3$ | 2–6 |

| Component | Mole Percent |
|---|---|
| SiO$_2$ | 77.5–84.5 |
| Al$_2$O$_3$ | 3–10 |
| Cu$_2$O | 6.5–10 |
| CoO | 2.5–6 |

In preparing the Cu$_2$O-Al$_2$O$_3$-SiO$_2$ base glass system, the following batch materials were used:

| | |
|---|---|
| SiO$_2$ | Kona Quintus Quartz |
| Al$_2$O$_3$ | Alcoa A-14-Alumina |
| CuO | Baker Analytical Reagent |
| Cu$_2$O | Fisher Certified Reagent |

However, it is to be understood that any suitable source material may be used in preparing the copper glasses without departing from the spirit and scope of the present invention.

Kona quintus quartz has the following analysis:

| | |
|---|---|
| Al$_2$O$_3$ | 0.040 |
| Fe$_2$O$_3$ | 0.0034 |
| Na$_2$O | 0.013 |
| K$_2$O | 0.0098 |
| TiO$_2$ | 0.001 |
| SiO$_2$ | Balance |

Fisher cuprous oxide is certified by the manufacturer as follows:

| | |
|---|---|
| Cu$_2$O assay | Not less than 96.0% |
| Substance soluble in ether | 0.40% |
| Insoluble matter in HNO$_3$ | 0.30% |
| Chloride | 0.5% |
| Sulfate | 0.05% |
| Substances not ppt by H$_2$S | 0.30% |
| Iron | 0.02% |
| Pine oil preservative | 0.50% |

Baker cupric oxide has the following analysis as defined by the manufacturer:

| | |
|---|---|
| Assay (CuO=) | 99.0% |
| Insoluble in HCl | 0.020% |

| | |
|---|---|
| Carbon compounds (as C) | 0.010% |
| Chloride | 0.005% |
| Nitrogen compounds (as N) | 0.002% |
| Sulfur compounds (as SO₄) | 0.020% |
| Free alkali | Passes A.C.S.Test |
| Substance not ppt by H₂S (as SO₄) | 0.20% |
| Ammonium hydroxide ppt | 0.10% |

Alcoa A-14 alumina is identified by the manufacturer as containing 99.6% $Al_2O_3$, 0.03% $Fe_2O_3$, 0.4% $Na_2O$, 0.12% $SiO_2$, 0.2% ignition loss at 1,100° C.

In the preparation of the examples which are described hereinafter, the batches were mixed by hand to obtain a homogeneous mixture. Any suitable mixing means and heating means can be employed to obtain the desired melt. All copper glasses were melted in 90% platinum 10% rhodium crucibles. Fused silica crucibles may also be used for this purpose and for molding operations. In the examples reported hereinafter, the sizes of the melts varied and included samples of 100 grams and 450 grams. The melting was carried out in electric furnaces wherein the melting temperature was in most instances about 1,500° C. In a few instances, 1,600° C. was employed with glasses which exhibited difficulty in melting. It was observed that 16 hours were generally sufficient for the duration of the melting to obtain a satisfactory glass. For the thermal expansion test, rods were drawn from the melts. To produce the rods, a silica or mullite rod was dipped into the molten glass for the start of rod pulling. In conducting the thermal expansion tests for accumulation of the data reported in the examples, a conventional dilatometric method was used (0°–300° C.) on samples that were 4 inches in length. A limited number of determinations of annealed, as well as unannealed, samples covering a wider temperature span (−200° C. to +300° C.) were run on the Carson-Dice dilatometer. It has been observed that annealed glasses exhibited about 1 unit ($1 \times 10^{-7}$) less thermal expansion (0°–300° C.) than unannealed glasses.

It has been observed that the addition of alumina increases the thermal expansion while the addition of cuprous oxide lowers it to a certain extent. Based on observations and calculations, the coefficient of thermal expansion for unannealed glasses can be expressed in the following formula (0°–300° C.):

$$\alpha = 5.5 \times 10^{-7} + 0.36 \times 10^{-9} \times n_{Al_2O_3} - 0.14 \times 10^{-9} \times n_{1/2Cu_2O}$$

where $nAl_2O_3$ = the mole % of alumina, $n_{1/2}Cu_2O$ = the mole % cuprous oxide counted as ½ $Cu_2O$.

The constant in the formula is equal to the thermal expansion for fused silica. It is believed that the alumina and the cuprous oxide individually modify the behavior of fused silica, but do not interact between themselves or counteract each other.

As noted above, one of the significant features of the present invention is the relative low melting temperature range and fluidity characteristics of the copper glasses of the present invention. The viscosity data reported in Table I, below, shows that the viscosity at the liquidus temperature makes the glasses of the present invention acceptable for working. While the working ranges of the glasses of the present invention are somewhat shorter than those of conventional soda-lime glasses, they are longer than those of non-alkali glasses. Moreover, the copper glasses of the present invention have desirable high temperature viscosity characteristics. Table I further defines the compositions shown in FIGS. 2, 3 and 4 and designated as "443," "454," and "565."

TABLE I.—VISCOSITY DATA—COPPER GLASSES

| | | 443 | 472 | 454 | 565 | A | Fused silica |
|---|---|---|---|---|---|---|---|
| Batch composition in mole percent. | SiO₂ | 75 | 75 | 77.5 | 80 | 83 | 100 |
| | Al₂O₃ | 12.5 | 10 | 10 | 7.5 | 1.3 | |
| | B₂O₃ | | 2.5 | | | 11.6 | |
| | Cu₂O | 12.5 | 12.5 | 12.5 | 12.5 | | |
| | Na₂O | | | | | 4.1 | |
| Liquidus, °C | | 1260 | 1316 | 1307 | | 1071 | |
| Log viscosity at Liquidus | | 4.3 | 4.1 | 4.2 | | 5.1 | |
| Strain Point, °C | | 610 | | 530 | | 520 | 1070 |
| Annealing Point, °C | | 640 | | 580 | | 560 | 1140 |
| Softening Point, °C | | 880 | | 880 | | 825 | 1665 |
| Working Point, °C | | 1305 | 1320 | 1350 | 1375 | 1240 | |
| Activation energy, high temperature viscosity, Kcal/mole | | 68.0 | 67.1 | 66.3 | 66.4 | 48.0 | 134.1 ±8.7 |

In the table above, the glass shown as "A" is a commercially available low expansion borosilicate glass.

In addition to the foregoing desirable properties, the chemical durability of the glasses of the present invention are also good. The glasses have been observed to have good resistance to water, acids and alkali.

Because of the fact that the copper glasses of the present invention grind and polish very easily, they are particularly well-suited for casting astronomical mirrors. These mirrors show excellent performance and the optical image is not substantially distorted by sharp variations in temperature. During the optical grinding and polishing steps, less heat is evolved from the glasses of the present invention than from harder glasses. This means that in conjunction with their low temperature expansion, which around room temperature is virtually zero for some of the copper glasses, the glass compositions of the present invention are ideal for optical purposes.

The following Tables contain examples of the novel copper glass compositions of the present invention and throughout it is to be understood that cuprous or cupric oxide can be used interchangeably provided equivalent amounts of copper are present.

TABLE IA.—THERMAL EXPANSION AND COMPOSITION
(Mole percent and Wt. percent)

| $\alpha \times 10^7$ (0–300 °C.) | SiO$_2$ Mole percent | SiO$_2$ Wt. percent | Al$_2$O$_3$ Mole percent | Al$_2$O$_3$ Wt. percent | Cu$_2$O Mole percent | Cu$_2$O Wt. percent |
|---|---|---|---|---|---|---|
| 6.9 | 77.5 | 63.25 | 12.5 | 17.31 | 10.0 | 19.43 |
| 5.1 | 77.5 | 62.38 | 10.0 | 13.65 | 12.5 | 23.95 |
| 6.9 | 65.0 | 47.66 | 17.5 | 21.77 | 17.5 | 30.55 |
| 6.1 | 85.0 | 73.53 | 7.5 | 11.01 | 7.5 | 15.45 |
| 7.3 | 75.0 | 57.95 | 7.5 | 9.83 | 17.5 | 32.20 |
| 5.1 | 79.0 | 64.12 | 8.5 | 11.70 | 12.5 | 24.16 |
| 7.2 | 82.5 | 71.35 | 12.5 | 18.34 | 5.0 | 10.29 |
| 5.4 | 87.5 | 76.85 | 5.0 | 7.45 | 7.5 | 15.68 |
| 4.8 | 81.5 | 67.10 | 6.0 | 8.38 | 12.5 | 24.50 |

The following Table IB contains specific examples which illustrate the copper glass compositions of the present invention wherein titania (TiO$_2$) or boric oxide (B$_2$O$_3$) is added to the Cu$_2$O-Al$_2$O$_3$-SiO$_2$ system. and titanium oxide are present together. The specific examples are intended to illustrate the present invention without limiting it in any way.

TABLE IB.—THERMAL EXPANSION AND COMPOSITION

| $\alpha \times 10^7$ (0–300 °C.) | SiO$_2$ Mole percent | SiO$_2$ Wt. percent | Al$_2$O$_3$ Mole percent | Al$_2$O$_3$ Wt. percent | TiO$_2$ Mole percent | TiO$_2$ Wt. percent | Cu$_2$O Mole percent | Cu$_2$O Wt. percent | CuO Mole percent | CuO Wt. percent | B$_2$O$_3$ Mole percent | B$_2$O$_3$ Wt. percent |
|---|---|---|---|---|---|---|---|---|---|---|---|---|
| 6.0 | 78.0 | 71.29 | 6.0 | 9.30 | 6.0 | 7.29 | | | 10.0 | 12.10 | | |
| 6.9 | 77.0 | 69.24 | 10.0 | 15.26 | 3.0 | 3.58 | | | 10.0 | 11.90 | | |
| 5.2 | 78.0 | 71.06 | 7.0 | 10.82 | 5.0 | 6.05 | | | 10.0 | 12.06 | | |
| 7.1 | 75.0 | 67.05 | 10.0 | 15.17 | 5.0 | 5.94 | | | 10.0 | 11.83 | | |
| 5.7 | 80.0 | 73.32 | 7.0 | 10.88 | 3.0 | 3.65 | | | 10.0 | 12.13 | | |
| 5.9 | 82.0 | 75.61 | 7.0 | 10.95 | 1.0 | 1.22 | | | 10.0 | 12.20 | | |
| 4.4 | 82.0 | 76.12 | 5.0 | 7.87 | 3.0 | 3.70 | | | 10.0 | 12.29 | | |
| 7.2 | 79.0 | 71.46 | 10.0 | 15.35 | 1.0 | 1.20 | | | 10.0 | 11.97 | | |
| 5.3 | 80.0 | 73.82 | 5.0 | 7.82 | 5.0 | 6.13 | | | 10.0 | 12.21 | | |
| 4.3 | 83.0 | 77.55 | 4.0 | 6.34 | 3.0 | 3.72 | | | 10.0 | 12.37 | | |
| 6.0 | 73.0 | 57.64 | 12.5 | 16.75 | 2.0 | 2.10 | 12.5 | 23.50 | | | | |
| 6.2 | 74.0 | 58.58 | 12.5 | 16.79 | 1.0 | 1.05 | 12.5 | 23.56 | | | | |
| 6.3 | 72.0 | 56.70 | 12.5 | 16.70 | 3.0 | 3.14 | 12.5 | 23.44 | | | | |
| 6.3 | 74.5 | 59.10 | 12.5 | 16.82 | | | 12.5 | 23.61 | | | 0.5 | 0.45 |
| 7.2 | 75.0 | 61.10 | 6.5 | 8.98 | | | 12.5 | 24.24 | | | 6.0 | 5.66 |
| 6.3 | 77.5 | 62.92 | 8.0 | 11.02 | | | 12.5 | 24.16 | | | 2.0 | 1.88 |

The following Table IB-1 shows low expansion copper glasses of the present invention wherein boric oxide Other copper glass compositions of the present invention are shown in the following Tables.

TABLE IB-1

| $\alpha \times 10^7$ (0–300 °C.) | SiO$_2$ Mole percent | SiO$_2$ Wt. percent | Al$_2$O$_3$ Mole percent | Al$_2$O$_3$ Wt. percent | TiO$_2$ Mole percent | TiO$_2$ Wt. percent | Cu$_2$O Mole percent | Cu$_2$O Wt. percent | CuO Mole percent | CuO Wt. percent | B$_2$O$_3$ Mole percent | B$_2$O$_3$ Wt. percent |
|---|---|---|---|---|---|---|---|---|---|---|---|---|
| 6.0 | 72.0 | 56.78 | 12.5 | 16.72 | 2.0 | 2.09 | 12.5 | 23.47 | | | 1.0 | 0.91 |
| 5.5 | 73.0 | 58.26 | 10.0 | 13.54 | 2.0 | 2.12 | 12.5 | 23.75 | | | 2.5 | 2.31 |
| 7.3 | 73.0 | 59.15 | 6.5 | 8.93 | 2.0 | 2.15 | 12.5 | 24.12 | | | 6.0 | 5.63 |
| 5.3 | 75.5 | 60.97 | 8.0 | 10.96 | 2.0 | 2.14 | 12.5 | 24.04 | | | 2.0 | 1.87 |
| 5.5 | 77.0 | 62.71 | 6.5 | 8.98 | 2.0 | 2.16 | 12.5 | 24.24 | | | 2.0 | 1.88 |
| 8.4 | 80.0 | 73.94 | 6.5 | 10.19 | 6.0 | 7.37 | | | 3.0 | 3.67 | 4.5 | 4.81 |
| 7.4 | 82.0 | 76.25 | 6.5 | 10.25 | 4.0 | 4.94 | | | 3.0 | 3.69 | 4.5 | 4.84 |
| 8.5 | 80.0 | 74.68 | 4.5 | 7.12 | 6.0 | 7.44 | | | 3.0 | 3.70 | 6.5 | 7.03 |
| 6.6 | 82.0 | 77.36 | 3.0 | 4.80 | 6.0 | 7.52 | | | 3.0 | 3.74 | 6.0 | 6.55 |
| 6.2 | 82.0 | 76.77 | 4.5 | 7.15 | 6.0 | 7.47 | | | 3.0 | 3.71 | 4.5 | 4.88 |

TABLE IC

| | 1 Mole percent | 1 Wt. percent | 2 Mole percent | 2 Wt. percent | 3 Mole percent | 3 Wt. percent | 4 Mole percent | 4 Wt. percent | 5 Mole percent | 5 Wt. percent | 6 Mole percent | 6 Wt. percent |
|---|---|---|---|---|---|---|---|---|---|---|---|---|
| SiO$_2$ | 77.5 | 63.84 | 75.0 | 58.42 | 80.0 | 64.94 | 78.0 | 62.98 | 73.0 | 56.57 | 73.0 | 57.16 |
| Al$_2$O$_3$ | 10.0 | 13.97 | 10.0 | 13.21 | 7.5 | 10.33 | 7.5 | 10.27 | 10.0 | 13.15 | 7.5 | 9.96 |
| Cu$_2$O | 10.0 | 19.61 | 12.5 | 23.18 | 10.0 | 19.33 | 10.0 | 19.22 | 12.5 | 23.06 | 12.5 | 23.31 |
| Iron oxide expressed as Fe$_2$O$_3$ | | | 2.5 | 5.17 | 2.5 | 5.39 | 2.5 | 5.36 | 2.5 | 5.14 | 2.5 | 5.20 |
| NiO | 2.5 | 2.56 | | | | | | | | | | |
| TiO$_2$ | | | | | | | 2.0 | 2.14 | 2.0 | 2.06 | 2.0 | 2.08 |
| B$_2$O$_3$ | | | | | | | | | | | 2.5 | 2.26 |
| $\alpha \times 10^7$ (0–300 °C.) | 8.0 | | 6.2 | | 6.3 | | 7.3 | | 6.6 | | 7.5 | |

TABLE ID

|  | 1 | | 2 | | 3 | | 4 | | 5 | |
| --- | --- | --- | --- | --- | --- | --- | --- | --- | --- | --- |
|  | Mole percent | Wt. percent | Mole percent | Wt. percent | Mole percent | Wt. percent | Mole percent | Wt. percent | Mole percent | Wt. percent |
| $SiO_2$ | 77.5 | 63.83 | 79.5 | 66.24 | 82.5 | 69.96 | 77.5 | 65.99 | 77.5 | 62.7 |
| $Al_2O_3$ | 10 | 13.97 | 8 | 11.31 | 5 | 7.19 | 10 | 14.45 | 9.12 | 12.4 |
| $Cu_2O$ | 10 | 19.61 | 10 | 19.84 | 10 | 20.19 | 6.5 | 13.18 | 12.5 | 23.9 |
| $CoO$ | 2.5 | 2.56 | 2.5 | 2.59 | 2.5 | 2.64 | 6 | 6.37 | | |
| $AlF_3$ | | | | | | | | | .88 | 1.0 |
| $\alpha \times 10^7$ (0–300 °C.) | 6.2 | | 6.3 | | 6.2 | | 8.5 | | 1.7 | |

Additional examples of copper glasses are the following:

| | 1 | | 2 | | 3 | | 4 | | 5 | | 6 | | 7 | |
| --- | --- | --- | --- | --- | --- | --- | --- | --- | --- | --- | --- | --- | --- | --- |
| Component | Mole percent | Wt. percent | Mole percent | Wt. percent | Mole percent | Wt. percent | Mole percent | Wt. percent | Mole percent | Wt. percent | Mole percent | Wt. percent | Mole percent | Wt. percent |
| $SiO_2$ | 72.3 | 53.9 | 75.0 | 55.3 | 75.0 | 51.6 | 70.0 | 51.5 | 75.0 | 56.6 | 75.0 | 58.1 | 77.5 | 45.8 |
| $Al_2O_3$ | 9.5 | 11.7 | 10.0 | 12.5 | 7.5 | 8.7 | 12.5 | 15.6 | 7.5 | 9.6 | 12.5 | 16.4 | 10.0 | 12.0 |
| $Cu_2O$ | 12.5 | 22.2 | 12.5 | 21.9 | 12.5 | 20.5 | 12.5 | 21.9 | 12.5 | 22.4 | 7.5 | 13.8 | 6.5 | 11.0 |
| $CeO_2$ | 5.0 | 10.7 | | | | | | | | | | | | |
| $Nd_2O_3$ | | | 2.5 | 10.3 | 5.0 | 19.2 | | | | | | | | |
| $V_2O_5$ | | | | | | | 5.0 | 11.1 | 5.0 | 11.4 | 5.0 | 11.7 | | |
| $AlF_3$ | 0.7 | 1.5 | | | | | | | | | | | | |
| $Ta_2O_5$ | | | | | | | | | | | | | 6.0 | 31.2 |
| $\alpha \times 10^7$ (0–300 °C.) | 20 | | 11.9 | | 23.9 | | 15.8 | | 32.7 | | 26.6 | | 6.0 | |
| Anneal. Pt. | | | 634 °C. | | | | | | | | | | 771 °C. | |
| Strain | | | 589 °C. | | | | | | | | | | | |

The fluoride-containing copper glasses of the present invention have particularly good chemical durability against acid, alkali and water and, therefore, these glasses are important in the manufacture of laboratory ware and other items of commerce. In addition, these glasses are good for sealing or soldering purposes, and may be used for a wide variety of purposes including, for example, sealing fused quartz. It is further notable that the fluoride-containing glasses are useful for fabricating mirrors, optical devices and the like. Data indicates that the fluoride-containing glasses consistently exhibit lower coefficients of thermal expansion and lower seal stress when sealed to fused silica than do those copper glasses which are free of fluoride. Moreover, the fluoride-containing glasses exhibit the added advantages of easier melting and forming at lower temperatures than do the fluoride-free glasses. Further, the fluoride-containing copper glasses also exhibit a lower annealing temperature than the fluoride-free counterpart copper glass compositions.

The following examples are illustrative of the present invention:

EXAMPLE I

The raw materials used for this batch were:

| | grams |
| --- | --- |
| Kona Quintus Quartz | 3119 |
| Alcoa A-14 Alumina | 589 |
| High Cupric Calumet | 1329 |
| Aluminum Trifluoride | 74 |

The resulting glass had the following composition in mole percent:

| | |
| --- | --- |
| $SiO_2$ | 77.0 |
| $Al_2O_3$ | 9.25 |
| $Cu_2O$ | 12.45 |
| $AlF_3$ | 1.30 |

The batch was melted at 2,850° F. for 24 hours.

The above glass was then remelted and various properties determined. The annealing point was 572° C. and the strain point was 520° C. The density of the glass was measured at 2.6959. The expansion (0°–300° C.) × $10^7$/° C. was measured as 5.0 while the contraction (AP-25° C.) × $10^7$/° C. was 10.0.

Flame seal data was also obtained as follows:

A given length of quartz rod was heated on the edge employing a gas-oxygen flame. Then a rod of the glass of Example I, above, was used to make a small bead which was then used to seal the fused quartz rod to another fused quartz surface in an air atmosphere. The value obtained for "seal psi vs. fused quartz contraction" was 1,300 T. (tension)

The above glass of Example I was also used for sealing one fused quartz surface to another fused quartz surface in a furnace under a nitrogen atmosphere. The furnace temperature was 2,200° to 2,300° F. Using two samples, stress temperature measurements were 250 and 350 psi. These values reflect the tension in the fused quartz which means that the solder glass is in compression because of its low thermal expansion.

The above glass composition of Example I was further tested to determine chemical durability. The following is a description of the standard procedure that was followed:

PREPARATION OF SAMPLE

Weigh out 100 g. of cullet of pieces from ¼ inch to 1 inch in size. Place approximately one-third of the sample (30–40 g.) in a special steel mortar, insert the pestle, and strike it sharply three times with a 32-oz. hammer. Empty contents of the mortar into an assembled nest of sieves, (No. 20, 40, 50, and pan). Repeat the crushing operation until all of the 100 g. sample has been added to the nest of sieves. Shake the nest of sieves for a short time by hand and then remove the glass from the Nos. 20 and 40 sieves, divide into thirds and recrush and sieve it as before. Repeat the crushing procedure for the third time, and shake on a Ro-Tap machine for five minutes. Reserve, as the sample for test, the glass grains that pass the No. 40 sieve and are retained on the No. 50 sieve (approximately 12 g.). After each sample has been processed, the mortar and sieves should be cleaned with an air jet or by shaking.

Spread the sample on a piece of glazed paper and pass a magnet through it to remove particles of iron that may have been introduced during the crushing operation. Transfer the entire sample to a basket made of No. 50 sieve screen in the shape of a 1⅝ inch cube with top side open. (The edges of the cube are folded or soldered. A wire handle is convenient). Wash the sample by agitating the basket and contents first in a beaker of distilled water for 1 minute, shake off excess moisture, and then rinse for 30 seconds in each of two beakers of USP 95% ethyl alcohol, shaking off excess alcohol after each rinse. Place the basket and contents in the drying oven at 140° C. for 20 minutes. Remove sample from the oven, transfer to a small, clean beaker, and place in a desiccator until the test is started. The samples should be prepared and tested on the same day.

PROCEDURE

Transfer 10.00 ±0.07 gms. of the prepared sample of glass to a 200 ml. Erlenmeyer borosilicate flask that has been previously aged with the attacking medium for at least 24 hours at 90° C. (Once a flask has been aged, it may be used repeatedly without further aging). Add exactly 50.0 ml. of the attacking medium, purified water, 0.02 N $H_2SO_4$, or 0.001 N $H_2SO_4$. Stopper the flask with a one-hole rubber stopper equipped with a 12 inch length of 3/16 inch chemically resistant glass tubing. Immerse the flask to a depth of 2 inches in the constant-temperature water bath held at 90°±0.2° C., and record the time at the start of the test. The flask is held upright and at the proper depth by split brass rings. At the end of 4 hours, remove the flask from the water-bath and proceed according to (a) or (b) below depending upon the attacking medium used.

a. PROCEDURE WITH WATER AS THE ATTACKING MEDIUM.

Cool the flask and its contents to approximately room temperature in running water. Transfer by pipette exactly 40 ml. of the extract solution to another flask, add 5 drops of methyl red indicator and titrate with 0.02 N $H_2SO_4$ to an excess of 1.00 ml. Heat the titrating flask to boiling, remove from the heat and swirl. Do this three times in order to remove all dissolved gases. While the solution is still hot, back-titrate with 0.02 N NaOH to the methyl red end-point. Calculate the results of the titrations to percentage of $Na_2O$ as follows:

(ml. 0.020 N $H_2SO_4$ − ml. 0.020 N NaOH) 0.00775 =% $Na_2O$.

b. PROCEDURE WITH 0.020 N $H_2SO_4$ AS THE ATTACKING MEDIUM.

Cool the flask in running water. Add two drops of methyl red indicator solution and titrate with 0.02 N NaOH to the end-point. Determine the value of the blank (ml. 0.02 N NaOH = 50.0 ml. 0.02 N $H_2SO_4$) and calculate the percent $Na_2O$ as follows:

$$(C - D)\ 0.0062 = \%Na_2O$$

where $C$ = ml. of 0.02 N NaOH equivalent to 50.0 ml. 0.02 N $H_2SO_4$
$D$ = ml. of 0.02 N NaOH used in the titration.
Example: 50.0 ml. 0.02 N $H_2SO_4$ = 49.5 ml. 0.02 N NaOH
(Blank - ml. 0.02 N NaOH in titer) 0.0062 = %$Na_2O$
49.5 − 45.0 = 4.5 × 0.0062 = 0.028% $Na_2O$

SPECIAL NaOH WEIGHT-LOSS TEST

The procedure for the NaOH weight-loss is as follows:

An accurately weighed one gram (1.0000 g. ± 0.0005) sample of crushed grains prepared by the Crushed-Sample technique is placed in a clean 40 ml. platinum dish. A 25 ml. portion of 5% carbonate-free NaOH solution is placed on the grains. A lid is placed on the dish and both are put into a 400 ml. beaker. The beaker is lowered into a preheated 90° C. ± 0.02° C. water bath. A watch glass cover is put over the beaker and weights are placed in it to hold the beaker well into the hot water. The sample is then held for 6 hours at 90° C.

The contents of the beaker are then filtered through Blue Ribbon No. 589 fine paper and washed with purified water. After drying the paper in a 140° C. oven the filter paper and residue are placed in a tared plantinum crucible. The paper is burned-off and then taken to 1,500° F. for 1 hour to ignite the residue. After cooling, the residue is weighed and reignited to constant weight and reported as weight loss in milligrams, from a 1 gram sample.

Test results are as follows:

TEST PROCEDURE

ACID TEST* — Crushed Sample Acid Test — 0.020 N $H_2SO_4$ (procedure "B") (Duplicate runs made).
Run 1 — Ex. 1 — 0.016% $Na_2O$, $H_2SO_4$ = 2.62 ml.
Run 2 — Ex. 1 — 0.015% $Na_2O$, $H_2SO_4$ = 2.42 ml.
WATER TEST* — Crushed Sample Water Test (procedure "A") (Duplicate runs made).
Run 1 — Ex. 1 — 0.0002% $Na_2O$, $H_2SO_4$ = 0.02 ml.
Run 2 — Ex. 1 — 0.0002% $Na_2O$, $H_2SO_4$ = 0.02 ml.
ALKALI TEST — 5% NaOH — 6 hr. wt. — loss test. (Duplicate runs made).
Run 1 — Ex. 1 — 17.0 mg/g weight loss
Run 2 — Ex. 1 — 16.4 mg/g weight loss
*The data reported herein is expressed as $Na_2O$ and also as milliliters of consumed $H_2SO_4$ in performing the titration because the sample analyzed was alkali free. Example 1 is disclosed on page 22 supra.

These test data illustrate the excellent chemical durability of the glasses of the present invention, particularly those copper glasses containing fluoride.

Further examples of the fluoride-containing glasses of the present invention are the following:

| Component | Mole Percent |
| --- | --- |
| $SiO_2$ | 77.48 |
| $B_2O_3$ | 4.36 |
| $Al_2O_3$ | 3.15 |
| $TiO_2$ | 5.81 |
| CuO | 2.91 |
| $AlF_3$ | 6.3 |
| Component | Mole Percent |
| $SiO_2$ | 82.93 |
| $Al_2O_3$ | 4.88 |
| $Cu_2O$ | 7.32 |
| $AlF_3$ | 4.88 |

According to the present invention, the fluoride-containing component may be added in an amount of up to about 6.5 mole percent, preferably up to about 1 mole percent. Although this aspect of the invention has been illustrated using $AlF_3$, other suitable fluoride-containing components capable of performing essentially the same function may also be employed.

As will be evident to persons skilled in the art, minor amounts of other components such as $Na_2O$ can be present as impurities in the original batch ingredients and will be present in the final copper glass compositions in very small amounts without deleteriously affecting the copper glasses for most applications. Where extra high purity is desired, other methods of preparing the glasses can be used to minimize or further reduce impurities.

It is understood that various other modifications will be apparent to and can readily be made by those skilled in the art without departing from the scope and spirit of this invention.

For example, the copper glasses of the present invention may be mixed in molten condition or finely comminuted condition with solid pieces of fused quartz. Various decorative and modified physical effects may be readily obtained thereby. Moreover, while emphasis has been placed on the low expansion glasses, various ingredients may be added to the copper glasses in order to modify the properties and raise the thermal expansion. For example, higher coefficients of thermal expansion are obtainable by including various metallic oxides in the glass.

Accordingly, it is not intended that the scope of the claims appended hereto be limited to the description set forth herein, but rather that the claims be construed as encompassing all the features which would be treated as equivalents thereof by those skilled in the art to which the invention pertains.

We claim:

1. A ternary copper glass composition having desirable low melting characteristics and consisting essentially of the following components in the indicated mole percent amounts based on the total composition:

| Component | Mole Percent |
|---|---|
| $SiO_2$ | 60–94 |
| $Al_2O_3$ | 0.5–30 |
| $Cu_2O + CuO$ (expressed as $Cu_2O$) | 1.5–35 |
| $Cu_2O$ | 0–35 |
| CuO (expressed as $Cu_2O$) | 0–35 |

2. A ternary copper glass composition as defined in claim 1, having a coefficient of linear thermal expansion of not more than about $10 \times 10^{-7}$ per °C. (0°–300° C.).

3. A ternary copper glass composition, as defined in claim 1, wherein the sum of $SiO_2 + Cu_2O + CuO$ (expressed as $Cu_2O$) is at least 70 mole percent.

4. A ternary copper glass composition, as defined in claim 1, wherein the $SiO_2$ is not more than 90 mole percent and the sum of $Cu_2O + CuO$ (expressed as $Cu_2O$) + $Al_2O_3$ is at least 10 mole percent.

5. A ternary copper glass composition, as defined in claim 1, wherein the $Al_2O_3$ is not more than 20 mole percent and the sum of $SiO_2 + Cu_2O + CuO$ (expressed as $Cu_2O$) is at least 80 mole percent.

6. A ternary copper glass composition, as defined in claim 1, wherein the mole ratio of $Cu_2O + CuO$ (expressed as $Cu_2O$):$Al_2O_3$ ranges from 0.9:1 to 2:1.

7. A ternary copper glass composition, as defined in claim 1, consisting essentially of the following components in the indicated mole percent amounts based on the total composition:

| Component | Mole Percent |
|---|---|
| $SiO_2$ | 75 |
| $Al_2O_3$ | 12.5 |
| $Cu_2O + CuO$ (expressed as $Cu_2O$) | 12.5 |
| $Cu_2O$ | 0–12.5 |
| CuO (expressed as $Cu_2O$) | 0–12.5 | said copper glass composition having a coefficient of linear thermal expansion of not more than about $10 \times 10^{-7}$ per °C. (0°–300° C.).

8. A ternary copper glass composition, as defined in claim 1, consisting essentially of the following components in the indicated mole percent amounts based on the total composition:

| Component | Mole Percent |
|---|---|
| $SiO_2$ | 77.5 |
| $Al_2O_3$ | 10 |
| $Cu_2O + CuO$ (expressed as $Cu_2O$) | 12.5 | said glass composition having a coefficient of linear thermal expansion of not more than about $10 \times 10^{-7}$ per °C. (0°–300° C.).

9. A ternary copper glass composition, as defined in claim 1, consisting essentially of the following components in the indicated mole percent amounts based on the total composition:

| Component | Mole Percent |
|---|---|
| $SiO_2$ | 80 |
| $Al_2O_3$ | 7.5 |
| $Cu_2O + CuO$ (expressed as $Cu_2O$) | 12.5 | said glass composition having a coefficient of linear thermal expansion of not more than about $10 \times 10^{-7}$ per °C. (0°–300 °C.).

10. A copper aluminosilicate glass composition consisting of the following components in the indicated mole percent amounts based on the total composition:

| Component | Mole percent |
|---|---|
| $SiO_2$ | 60–90 |
| $Al_2O_3$ | 0.5–30 |
| $Cu_2O + CuO$ (expressed as $Cu_2O$) | 1.5–35 |
| $Cu_2O$ | 0–35 |
| CuO (expressed as $Cu_2O$) | 0–35 | wherein the sum of $SiO_2 + Cu_2O + CuO$ (expressed as $Cu_2O$) is at least 70 mole percent and the sum of $Cu_2O + CuO$ (expressed as $Cu_2O$)+ $Al_2O_3$ is at least 10 mole percent.

11. A copper aluminosilicate glass composition, as defined in claim 10, wherein the mole ratio of $Cu_2O + CuO$ (expressed as $Cu_2O$) : $Al_2O_3$ ranges from 0.9:1 to 2:1.

12. A copper glass composition having desirable low melting characteristics and consisting of the following components in the indicated mole percent amounts based on the total composition:

| Component | Mole Percent |
|---|---|
| $SiO_2$ | 50–94 |
| $Al_2O_3$ | 0.5–29.5 |
| $Cu_2O + CuO$ (expressed as $Cu_2O$) | 1.5–35 |
| $Cu_2O$ | 0–35 |
| CuO (expressed as $Cu_2O$) | 0–35 |
| $TiO_2$ | 0–11 |
| $B_2O_3$ | 0–12.5 | wherein the sum of $TiO_2 + B_2O_3$ is at least 0.5 mole percent, the sum of $SiO_2 + Cu_2O + CuO$ (expressed as $Cu_2O$) is at least 70 mole percent.

13. A copper glass composition, as defined in claim 12, wherein the sum of $Cu_2O + CuO$ (expressed as $Cu_2O$) + $Al_2O_3$ is at least 5 mole percent.

14. A copper glass composition, as defined in claim 12, consisting of the following components in the indicated mole percent amounts based on the total composition:

| Component | Mole Percent |
|---|---|
| $SiO_2$ | 72-92 |
| $Al_2O_3$ | 0.5-12.5 |
| $Cu_2O$ CuO (expressed as $Cu_2O$) | 1.5-12.5 |
| $Cu_2O$ | 0-12.5 |
| CuO (expressed as $Cu_2O$) | 0-12.5 |
| $TiO_2$ | 0-11 |
| $B_2O_3$ | 0-12.5 |

15. A copper glass composition, as defined in claim 12, consisting of the following components in the indicated mole percent amounts based on the total composition:

| Component | Mole Percent |
|---|---|
| $SiO_2$ | 72-86 |
| $Al_2O_3$ | 0.5-12.5 |
| $Cu_2O + CuO$ (expressed as $Cu_2O$) | 1.5-12.5 |
| $Cu_2O$ | 0-12.5 |
| CuO (expressed as $Cu_2O$) | 0-12.5 |
| $TiO_2$ | 1-8 |
| $B_2O_3$ | 0.5-6.5 |

16. A copper glass composition, as defined in claim 12, consisting of the following components in the indicated mole percent amounts based on the total composition:

| Component | Mole Percent |
|---|---|
| $SiO_2$ | 74-86 |
| $Al_2O_3$ | 2.5-12.5 |
| $Cu_2O + CuO$ (expressed as $Cu_2O$) | 3-12.5 |
| $Cu_2O$ | 0-12.5 |
| CuO (expressed as $Cu_2O$) | 0-12.5 |
| $B_2O_3$ | 0.5-12.5 |

17. A copper glass, as defined in claim 12, consisting of the following components in the indicated mole percent amounts based on the total composition:

| Component | Mole Percent |
|---|---|
| $SiO_2$ | 75 |
| $Al_2O_3$ | 10 |
| $B_2O_3$ | 2.5 |
| $Cu_2O + CuO$ (expressed as $Cu_2O$) | 12.5 | said glass having a coefficient of linear thermal expansion of not more than about $10 \times 10^{-7}$ per °C. (0°-300° C.).

18. A copper glass composition, as defined in claim 12, wherein the $Al_2O_3$ is not more than 19.5 mole percent and the sum of $SiO_2 + Cu_2O + CuO$ (expressed as $Cu_2O$) is at least 80 mole percent.

19. A copper glass composition, as defined in claim 18, wherein the sum of $Cu_2O + CuO$ (expressed as $Cu_2O$) + $Al_2O_3$ is at least 5 mole percent.

20. A copper glass composition, as defined in claim 12, consisting of the following components in the indicated mole percent amounts based on the total composition:

| Component | Mole Percent |
|---|---|
| $SiO_2$ | 72-90 |
| $Al_2O_3$ | 2.5-12.5 |
| $Cu_2O + CuO$ (expressed as $Cu_2O$) | 3-12.5 |
| $Cu_2O$ | 0-12.5 |
| CuO (expressed as $Cu_2O$) | 0-12.5 |
| $TiO_2$ | 1-10.1 |

21. A copper glass composition, as defined in claim 20, consisting of the following components in the indicated mole percent amounts based on the total composition:

| Component | Mole Percent |
|---|---|
| $SiO_2$ | 74.5-88 |
| $Al_2O_3$ | 2.5-10 |
| $Cu_2O + CuO$ (expressed as $Cu_2O$) | 7.5-12.5 |
| $Cu_2O$ | 0-12.5 |
| CuO (expressed as $Cu_2O$) | 0-12.5 |
| $TiO_2$ | 1-6 |

22. A copper glass composition consisting of the following components in the indicated mole percent amounts based on the total composition:

| Component | Mole Percent |
|---|---|
| $SiO_2$ | 50-94 |
| $Al_2O_3$ | 0.5-29.5 |
| $Cu_2O + CuO$ (expressed as $Cu_2O$) | 1.5-35 |
| $Cu_2O$ | 0-35 |
| CuO (expressed as $Cu_2O$) | 0-35 | wherein the sum of $SiO_2 + Cu_2O + CuO$ (expressed as $Cu_2O$) is at least 70 mole percent together with at least one of the following components present in more than a trace amount in the indicated mole percent amounts based on the total composition:

| Component | Mole Percent |
|---|---|
| NiO | 0-2.5 |
| Iron oxide expressed as $2O_3$ | 0-6 |
| $TiO_2$ | 0-11 |
| $B_2O_3$ | 0-12.5 |
| CoO | 0-6 |
| Fluoride expressed as $AlF_3$ | 0-6.5 |

23. A copper glass composition, as defined in claim 22, wherein said copper glass composition possesses a coefficient of linear thermal expansion of not more than about $10 \times 10^{-7}$ per °C. (0°-300° C.).

24. A copper glass composition, as defined in claim 22, wherein the sum of $SiO_2 + Cu_2O + CuO$ (expressed as $Cu_2O$) is at least 85 mole percent and the maximum $Al_2O_3$ is 14.5 mole percent.

25. A copper glass composition, as defined in claim 22, consisting of the following components in the indicated mole percent amounts based on the total composition:

| Component | Mole Percent |
|---|---|
| $SiO_2$ | 77.5 |
| $Al_2O_3$ | 10 |
| $Cu_2O + CuO$ (expressed as $Cu_2O$) | 10 |
| $Cu_2O$ | 0-10 |
| CuO (expressed as | |

NiO  2.5

26. A copper glass composition, as defined in claim 22, consisting of the following components in the indicated mole percent amounts based on the total composition:

| Component | Mole Percent |
|---|---|
| $SiO_2$ | 73–80 |
| $Al_2O_3$ | 6.5–10 |
| $Cu_2O + CuO$ (expressed as $Cu_2O$) | 10–12.5 |
| $Cu_2O$ | 0–12.5 |
| CuO (expressed as $Cu_2O$) | 0–12.5 |
| $TiO_2$ | 1 |
| $B_2O_3$ | 1 |
| Iron oxide expressed as $Fe_2O_3$ | 1–6 |

27. A copper glass composition, as defined in claim 22, consisting of the following components in the indicated mole percent amounts based on the total composition:

| Component | Mole Percent |
|---|---|
| $SiO_2$ | 73–80 |
| $Al_2O_3$ | 6.5–10 |
| $Cu_2O + CuO$ (expressed $Cu_2O$) | 10–12.5 |
| $Cu_2O$ | 0–12.5 |
| CuO (expressed as $Cu_2O$) | 0–12.5 |
| $TiO_2$ | 1.5 |
| Iron oxide expressed as $Fe_2O_3$ | 2–6 |

28. A copper glass composition, as defined in claim 22, consisting of the following components in the indicated mole percent amounts based on the total composition:

| Component | Mole Percent |
|---|---|
| $SiO_2$ | 77.5–84.5 |
| $Al_2O_3$ | 3–10 |
| $Cu_2O + CuO$ (expressed as $Cu_2O$) | 6.5–10 |
| $Cu_2O$ | 0–10 |
| CuO (expressed as $Cu_2O$) | 0–10 |
| CoO | 2.5–6 |

29. A copper glass composition, as defined in claim 22, having desirable low melting characteristics and consisting of the following components in the indicated mole percent amounts based on the total composition:

| Component | Mole Percent |
|---|---|
| $SiO_2$ | 50–94 |
| $Al_2O_3$ | 0.5–29.5 |
| $Cu_2O + CuO$ (expressed as $Cu_2O$) | 1.5–35 0 |
| $Cu_2O$ | 0–35 |
| CuO (expressed as $Cu_2O$) | 0–35 |
| Fluoride expressed as $AlF_3$ | more than a trace–up to 6.5 | wherein the sum of $SiO_2 + Cu_2O + CuO$ (expressed as $Cu_2O$) is at least 70 mole percent.

30. A copper glass composition, as defined in claim 29, having desirable low melting characteristics and consisting of the following components in the indicated mole percent amounts based on the total composition:

| Component | Mole Percent |
|---|---|
| $SiO_2$ | 77 |
| $Al_2O_3$ | 9.25 |
| $Cu_2O + CuO$ (expressed as $Cu_2O$) | 12.45 |
| $Cu_2O$ | 0–12.45 |
| CuO (expressed as $Cu_2O$) | 0–12.45 |
| Fluoride expressed as $AlF_3$ | 1.3 |

31. A copper glass composition, as defined in claim 22, consisting of compatible glass forming constituents in the following range of mole percents:

| Constituents | Mole Percent |
|---|---|
| $SiO_2$ | 50–94 |
| $Al_2O_3$ | 0.5–19.5 |
| $Cu_2O + CuO$ (expressed as $Cu_2O$) | 1.5–35 |
| $Cu_2O$ | 0–35 |
| CuO (expressed as $Cu_2O$) | 0–35 | and at least 0.5 mole percent of the following constituents in the indicated mole percent:

| | |
|---|---|
| $TiO_2$ | 0–11 |
| $B_2O_3$ | 0–12.5 |
| Fluoride expressed as $AlF_3$ | 0–6.5 |
| Iron oxide expressed as $Fe_2O_3$ | 0–6 |
| CoO | 0–6 |
| NiO | 0–2.5 | the total mole percent of $SiO_2 + Cu_2O + CuO$ (expressed as $Cu_2O$) is at least 80 mole percent.

32. A copper glass composition, as defined in claim 31, wherein the total mole percent of $SiO_2 + Cu_2O + CuO$ (expressed as $Cu_2O$) is at least 85 mole percent and the total $Al_2O_3$ is no more than 14.5%.

33. A copper glass composition, as defined in claim 31, wherein the mole percent ranges of $SiO_2$, $Al_2O_3$ and $Cu_2O + CuO$ (expressed as $Cu_2O$) are respectively in the following indicated ranges of mole percent:

| Constituents | Mole Percent |
|---|---|
| $SiO_2$ | 73–80 |
| $Al_2O_3$ | 6.5–10 |
| $Cu_2O + CuO$ (expressed as $Cu_2O$) | 10–12.5 |

34. A copper glass composition as defined in claim 22, consisting of compatible glass forming constituents in the following range of mole percents:

| Constituents | Mole Percent |
|---|---|
| $SiO_2$ | 50–94 |
| $Al_2O_3$ | 0.5–29.5 |
| $Cu_2O + CuO$ (expressed as $Cu_2O$) | 1.5–35 |
| $Cu_2O$ | 0–35 |
| CuO (expressed as $Cu_2O$) | 0–35 |
| $TiO_2$ | 0–2 |
| $B_2O_3$ | 0–2.5 |
| $AlF_3$ | 0–6.5 |
| $Fe_2O_3$ | 0–6 |
| CoO | 0–6 |
| NiO | 0–2.5 | wherein the sum of $SiO_2 + Cu_2O$ is at least 70 mole percent and the sum of $TiO_2 + B_2O_3$ + fluoride expressed as $AlF_3$ + iron oxide expressed as $Fe_2O_3 + CoO + NiO$ is at least 0.5 mole percent.

35. A copper glass composition as defined in claim 22, consisting of the following components in the indicated mole percent amount based on the total composition:

| Component | Mole Percent |
|---|---|
| $SiO_2$ | 75 |
| $Al_2O_3$ | 10 |
| $Cu_2O + CuO$ (expressed as $Cu_2O$) | 12.5 |
| $Cu_2O$ | 0–12.5 |
| CuO (expressed as $Cu_2O$) | 0–12.5 |
| Iron oxide expressed as $Fe_2O_3$ | 2.5 | said glass having a coefficient of linear thermal expansion of not more than about $10 \times 10^{-7}$ per °C. (0°–300° C.).

36. In an astronomical mirror telescope a shaped body of glass providing enhanced optical resolution for visual telescope observations, said glass consisting of a homogeneous solid body of oxides of the following compatible glass forming constituents in the indicated range of mole percent:

| Constituent Oxides | Mole Percent |
| --- | --- |
| Copper (expressed as Cu$_2$O) | 1.5–35 |
| Aluminum | 0.5–30 |
| Silicon | 50–94 | said oxides of copper and silicon constituting at least 70 mole percent of said glass.

37. A glass mirror for an astronomical telescope consisting of a shaped body of glass consisting of oxides of copper, aluminum and silicon in the following range of mole percent;

| Constituent Oxides | Mole Percent |
| --- | --- |
| Copper (expressed as Cu$_2$O) | 1.5–35 |
| Aluminum | 0.5–30 |
| Silicon | 50–94 | said glass mirror possessing a coefficient of linear thermal expansion over the range of from 0° C. to 300° C. of not greater than $10 \times 10^{-7}$ per °C.

38. A copper aluminosilicate glass composition consisting of the oxides of copper, aluminum and silicon in the following minimum amounts:

| Constituent Oxides | Minimum Mole Percent |
| --- | --- |
| Copper (expressed as Cu$_2$O) | At least 1.5 |
| Aluminum | At least 0.5 |
| Silicon | At least 60 | and wherein the sum of the oxides of copper expressed as Cu$_2$O and of silicon totals at least 70 mole percent and the sum of the oxides of copper expressed as Cu$_2$O and of aluminum totals at least 5 mole percent.

* * * * *

UNITED STATES PATENT OFFICE
CERTIFICATE OF CORRECTION

Patent No. 3,779,781  Dated December 18, 1973

Inventor(s) Nils Tryggve E. A. Baak and Charles Rapp

It is certified that error appears in the above-identified patent and that said Letters Patent are hereby corrected as shown below:

Abstract, line 5, after "good" first occurrence, insert -- optical --. Column 7, line 9, "0.4%" should be -- 0.04% --; line 67, "$n_{Al\ O}$" should be --$n_{Al_2O_3}$--. TABLE I Col. 8, Heading, delete "X" in "$A_X$". Col. 13, lines 24, 42, 46, 49, 51, 55, 57, 61, 62, 63, 64 and 66, "N" should be --$\underline{N}$--. Col. 14, line 29, "N" should be --$\underline{N}$--.

Col. 17, line 14, under "Component" "$Cu_2O-CuO$" should be --$Cu_2O+CuO$--; line 33, "1-8" should be --2-8--. Col. 18, line 45, "$2O_3$" should be --$Fe_2O_3$--. Col. 19, line 1, "20)" should be --$Cu_2O$)--and under the column "Mole percent" --0-10-- should be inserted; line 23, after "expressed" insert --as--; line 49, "1.5-350" should be --1.5-35--. Col. 15, line 67, "$Cu_2O$" should be --$Cu_2O$)--.

Signed and sealed this 31st day of December 1974.

(SEAL)
Attest:

McCOY M. GIBSON JR.                C. MARSHALL DANN
Attesting Officer                  Commissioner of Patents